(12) United States Patent
Li

(10) Patent No.: US 9,311,650 B2
(45) Date of Patent: Apr. 12, 2016

(54) DETERMINING SEARCH RESULT RANKINGS BASED ON TRUST LEVEL VALUES ASSOCIATED WITH SELLERS

(71) Applicant: Alibaba Group Holding Limited, George Town (KY)

(72) Inventor: Jiasen Li, Hangzhou (CN)

(73) Assignee: Alibaba Group Holding Limited (KY)

( * ) Notice: Subject to any disclaimer, the term of this patent is extended or adjusted under 35 U.S.C. 154(b) by 173 days.

(21) Appl. No.: 13/771,325

(22) Filed: Feb. 20, 2013

(65) Prior Publication Data
US 2014/0236942 A1    Aug. 21, 2014

(30) Foreign Application Priority Data
Feb. 22, 2012   (CN) .......................... 2012 1 0042837

(51) Int. Cl.
G06F 7/00       (2006.01)
G06Q 30/02      (2012.01)
G06F 17/30      (2006.01)

(52) U.S. Cl.
CPC .......... *G06Q 30/02* (2013.01); *G06F 17/30867* (2013.01)

(58) Field of Classification Search
None
See application file for complete search history.

(56) References Cited

U.S. PATENT DOCUMENTS

| | | | |
|---|---|---|---|
| 6,006,218 A * | 12/1999 | Breese et al. | |
| 6,480,837 B1 * | 11/2002 | Dutta | |
| 7,464,051 B1 * | 12/2008 | Heggem | 705/26.2 |
| 8,301,728 B2 | 10/2012 | Kumar et al. | |
| 8,352,467 B1 | 1/2013 | Guha | |
| 8,768,932 B1 * | 7/2014 | Kacholia et al. | 707/748 |
| 2003/0033298 A1 | 2/2003 | Sundaresan | |
| 2004/0083161 A1 | 4/2004 | Maeda et al. | |
| 2007/0179942 A1 | 8/2007 | Heggem | |
| 2008/0040281 A1 * | 2/2008 | Chakraborty et al. | 705/52 |
| 2008/0082528 A1 * | 4/2008 | Bonzi et al. | 707/5 |
| 2010/0010871 A1 * | 1/2010 | Mengerink | 705/10 |
| 2010/0042701 A1 * | 2/2010 | Cole | 709/217 |

(Continued)

FOREIGN PATENT DOCUMENTS

| | | |
|---|---|---|
| JP | 2003099652 | 4/2003 |
| JP | 2004171360 | 6/2004 |

(Continued)

OTHER PUBLICATIONS

Ebay Trading API, Dec. 3, 2010, http://developer.ebay.com/devzone/xml/docs/Reference/ebay/GetUser.html.*

*Primary Examiner* — Robert Beausoliel, Jr.
*Assistant Examiner* — Hau H Hoang
(74) *Attorney, Agent, or Firm* — Van Pelt, Yi & James LLP

(57) ABSTRACT

Adjusting search results ranking is disclosed, including: receiving a search query comprising one or more keywords submitted by a user; determining intermediate ranked results comprising a plurality of sets of product information matching the one or more keywords; determining a trust level value associated with the user with respect to a first seller of a plurality of sellers associated with the intermediate ranked results, wherein the trust level value is determined based at least in part on one or more historical user product information evaluation records associated with the first seller submitted by the user; and adjusting ranking associated with the intermediate ranked results based at least in part on the determined trust level value associated with the user with respect to the first seller to determine final ranked results.

26 Claims, 4 Drawing Sheets

(56) References Cited

U.S. PATENT DOCUMENTS

| | | |
|---|---|---|
| 2011/0040825 A1 | 2/2011 | Ramzan et al. |
| 2011/0314005 A1 | 12/2011 | Guo |
| 2012/0265755 A1 | 10/2012 | McNally |
| 2012/0284282 A9 | 11/2012 | Ghosh et al. |
| 2013/0103672 A1* | 4/2013 | Parikh et al. ............... 707/717 |

FOREIGN PATENT DOCUMENTS

| | | |
|---|---|---|
| JP | 2009070021 | 4/2009 |
| JP | 2011128806 | 6/2011 |
| JP | 2011138241 | 7/2011 |
| WO | 2011025696 A1 | 3/2011 |

* cited by examiner

US 9,311,650 B2

DETERMINING SEARCH RESULT RANKINGS BASED ON TRUST LEVEL VALUES ASSOCIATED WITH SELLERS

CROSS REFERENCE TO OTHER APPLICATIONS

This application claims priority to People's Republic of China Patent Application No. 201210042837.3 entitled A SEARCH METHOD FOR E-BUSINESS SEARCH ENGINES AND AN E-BUSINESS SEARCH ENGINE, filed Feb. 22, 2012 which is incorporated herein by reference for all purposes.

FIELD OF THE INVENTION

The present application relates to the field of search engine technology. In particular, it relates to a search technique for electronic commerce (e-commerce) search engines.

BACKGROUND OF THE INVENTION

In the wake of the continual development of computer technology, users are becoming increasingly reliant on information that is stored in large quantities by computer systems. Search engines, which are now in wide use, aim to help users to conduct searches among large volumes of information and to obtain useful information in a quick and convenient manner. Search engines have achieved great success in the information search field and a great number of beneficial search techniques have been developed and adopted. The technical improvements and optimizations to various search engines have been directly reflected in optimized search results.

The typical search method for e-commerce website search engines is as follows: keywords of search queries input by a user at an e-commerce website are received; product information matching the keywords is obtained; the product information is ranked as search results; and lastly, the ranked search results are output at a display for the user.

To improve search accuracy, an e-commerce search engine may adopt some search ranking strategies to aid users in rapidly finding the product information that they need. One example of a typical search ranking technique of product information that matches a user's search query may be ranked based on index term weights and combined scores for product information and sellers. The "index" referred to is a search engine index, where webpages are indexed in advance of searches based on the data that is included in each webpage. Combined scores for product information and sellers may be determined based on assigning scores to words, phrases, names of people, concepts, letters, characters, numbers, and other such values that are associated with each piece of product information and then determining a combined score for each matching piece of product information. Another example of a typical search ranking of product information that matches a user's search query may be ranked based on index term weights and the single dimension of a product's price or the sales volume of a certain product.

To summarize, typical search ranking strategies currently used by e-commerce website search engines primarily include: a ranking technique that is based on a combination of factors such as product information title keywords, price, transaction quantity, seller scores, and various other measures. However, one drawback of typical search ranking strategies is that they generally rank product information without considering individual user differences. In other words, typical search ranking strategies will typically return the same search results for User A and User B if User A and User B simply input the same keywords into the e-commerce website search engine. But, as individuals, different users may have different preferences. Thus, inevitably, different users are very likely to have different consumer behaviors, and consequently different users will expect different search results.

BRIEF DESCRIPTION OF THE DRAWINGS

Various embodiments of the invention are disclosed in the following detailed description and the accompanying drawings.

DETAILED DESCRIPTION

Figure 1:
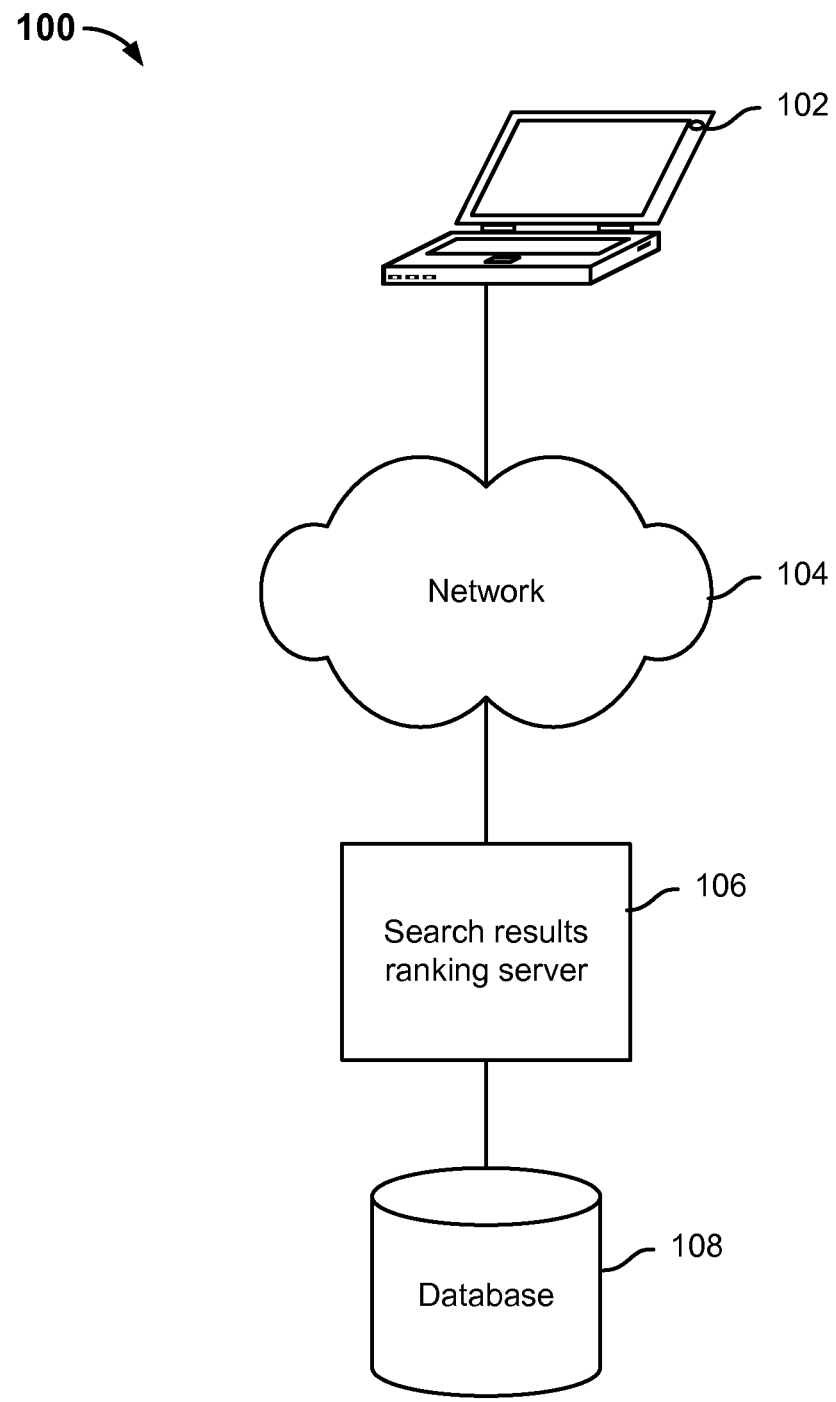
FIG. 1 is a diagram showing an embodiment of a system for adjusting search result rankings based on user trust level values with sellers.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Individuals often have different tastes, experiences, and preferences. So two different consumers, User A and User B, for example, may have different shopping preferences. Failure to consider an individual's preferences may result in search results which User A would not prefer being ranked higher in the ranked list of search results presented for User A.

Ideally, search results that a user may prefer and wish to find efficiently should be placed higher among the displayed search results. For example, placing the product information associated with a seller who has been the subject of complaints of a particular user high among the search results returned for that user may adversely affect the user's experience and waste the user's time because the user may want to skip over such product information associated with the particular seller to whom the user has previously given a poor review.

If search results are to be optimized, then the individual differences of users should be considered during search ranking Individual differences of users to consider may be determined by analyzing data that reflects individual user differences. For example, characteristics that may reflect a certain user's preferences may include that user's purchasing power, the user's price sensitivity, regional characteristics associated with a geographic area associated with the user, the user's historical purchasing records, the user's product information evaluation records, and the user's product information preferences.

A user's characteristics such as the purchasing power, price sensitivity, and regional characteristics mentioned above may not have objective evaluation measures. Therefore, those characteristics may not be capable of being objectively evaluated to reflect the individual differences of users. However, historical data on user transactions do include historical purchase records, product information evaluation records, product information preferences, and other such characteristics that may be objectively evaluated to reflect the individual differences of users. As such, at least some of such user's characteristics that can be objectively quantified may be used to perform ranking of search results to better account for a user's tastes, experiences, and preferences. However, it is very difficult to quantify a user's historical purchase records and product information preferences into specific numerical values, while it is relatively easy to quantify a user's historical product information evaluation records (e.g., because such evaluations may comprise numerical values or text that could be easily mapped to numerical values). Therefore, in various embodiments, the characteristics of a user's historical product information evaluation records are used to optimize search results. In some embodiments, no other user's characteristics, such as for example, a user's historical purchase records and product information preference characteristics, are used in addition to the user's historical product information evaluation records to optimize search results. In various embodiments, product information evaluation records comprise user submitted reviews, ratings, grading, and/or feedback associated with a product associated with a particular seller. For example, a product information evaluation record may include a user's selection of a particular grade (e.g., a letter grade or a numerical grade) on a predetermined scale and/or accompanying text. For example, User A may submit a product information evaluation for a Princeton brand tennis racquet sold by seller SportsKing.

Sometimes, a stored product information evaluation record is associated with a specific set of product information. For example, a set of product information is associated with a particular product sold by a particular seller. In some embodiments, each set of product information may be associated with a webpage at the e-commerce website that advertises the product information (e.g., input by the seller) associated with a certain product. Each set of product information may be associated with a product information identifier. So if a product information evaluation record is associated with a particular set of product information, then the product information evaluation record is sometimes linked to the set of product information based on stored data associated with an identifier of the specific set of product information. However, in some instances, whenever a seller edits/updates a particular set of product information, the edited/updated set of product information is stored with a new product information identifier. As a result, an edited/updated set of product information associated with a previous version for which a user's product information evaluation record rated poorly may not be similarly associated with the user's poor review because the edited/updated product information evaluation record is associated with a new product identifier. Thus, one possible side effect of associating a certain product information evaluation with a product information identifier is that the product information evaluation record may not be associated with subsequent edited/updated versions of that set of product information.

Therefore, in some embodiments, a product information evaluation record is associated with a seller rather than a particular product information identifier. This way, the product information evaluation record can still reflect the evaluating user's experience with the evaluated product, purchase process, and/or seller associated with a product without being only associated with a specific version of a set of product information. So regardless of how many times the seller edits/updates a certain set of product information, a user's product information evaluation record will still be associated with that seller. In some embodiments, a seller is identified by a seller identifier. At some e-commerce websites, once a seller's identifier has been registered, it cannot be changed. In some embodiments, each search result at the e-commerce website is associated with a particular set of product information and the ranking of the search result is adjusted based on one or more historical product information evaluation records submitted by the searching user for the seller associated with the set of product information of that search result. In various embodiments, a trust level value is determined for a seller based on a searching user's one or more historical product information evaluation records associated with that seller. In various embodiments, the trust level values associated with the searching user with respect to various sellers are used in adjusting the ranking of returned search results.

If the trust level value associated with a user is computed with respect to every seller associated with an e-commerce website, then the computations may be burdensome and time consuming due to the large number of users and sets of product information that are associated with the e-commerce website. For example, an e-commerce website may be associated with tens of millions of registered users and hundreds of millions of sets of product information associated with hundreds of thousands of sellers. If it is assumed that each user has submitted on average 10 historical product information evaluations every six months, then the number of product information evaluations that need to be examined for each user with respect to each unique seller is still tremendous. Therefore, it would be too impractical to determine the trust level value associated with a user with respect to each seller associated with the e-commerce website.

To reduce the trust level value computations associated with a user with respect to various sellers, in various embodiments, a two part search results ranking technique is to be used. As will be further described below, in various embodiments, intermediate ranked results comprising ranked sets of product information that match a user submitted search query are determined. In some embodiments, the intermediate ranked results are preliminarily ranked based on a known technique. The number of intermediate ranked results is limited to a predetermined amount (e.g., a few thousand sets of product information). Then, in various embodiments, the ranking sequence of the sets of product information included in the intermediate ranked results is adjusted based on determined trust level values between the user and one or more sellers associated with search results. By limiting the number of intermediate ranked results to the predetermined number, only the trust level value between the user and each seller that is associated with at least one of the sets of product information included in the intermediate ranked results need to be considered when computing a trust level value of a user with respect to a seller. In other words, by limiting the number of sets of product information that need to be analyzed to compute trust level values to the predetermined number for intermediate ranked results, the computation of trust level values associated with a seller is greatly reduced. In some embodiments, the final ranked results that include the adjusted intermediate ranked results may be returned and displayed for the user.

Because users have a tendency to purchase products from sellers that they trust, adjusting the ranking of search results based on trust level values between a user and various sellers will enable a user to find search results associated with more trusted sellers sooner (earlier and/or among the ranked list of displayed search results) and more conveniently among the ranked search results because such search results will be ranked higher on the list.

FIG. 1 is a diagram showing an embodiment of a system for adjusting search result rankings based on user trust level values with sellers. In the example, system 100 includes device 102, network 104, search results ranking server 106, and database 108. Network 104 may include high-speed data networks and/or telecommunications networks. Device 102 may communicate with search results ranking server 106 over network 104.

A user may use device 102 to access an e-commerce website associated with search results ranking server 106. While device 102 is shown to be a laptop, other examples of device 102 may include a desktop computer, tablet device, mobile device, smart phone, and any other type of computing device. Over time, as the user purchases products from the website, the user may submit product information evaluations for certain products that the user has previously purchased. Such product information evaluations may comprise user feedback, ratings, reviews, or grades for products. Product information evaluations are stored at database 108. Furthermore, a user may submit a search query at the website to search for products that he/she may wish to purchase. The submitted search query is received at search results ranking server 106.

In response to receiving the search query from device 102, search results ranking server 106 is configured to determine sets of product information that match the keyword(s) of the search query. In various embodiments, a set of product information is associated with the seller that input the information. The set of product information describes a particular product sold by that seller. A set of product information that matches a search query is determined to be a search result. In some embodiments, the determined search results are preliminarily ranked based on a known technique (e.g., index term weights and composite scores, as will be further described below) to form the intermediate ranked results. In some embodiments, only the top predetermined number of search results from the intermediate ranked results is retained for further processing while the rest are discarded. In various embodiments, a trust level value associated with the user with respect to each seller associated with a search result in the intermediate ranked results is determined based on the user's historical product information evaluations associated with the seller. For example, the user's historical product information evaluations may be obtained from database 108. In various embodiments, a user's trust level value with respect to a seller refers to the degree to which a user trusts that seller and/or products sold by the seller. It is assumed that a user would prefer to view search results associated with more trusted sellers quickly and as such, in various embodiments, search results associated with sellers associated with higher trust level values will appear earlier among the displayed search results. As will be further described below, in various embodiments, the ranking of the search results included in the intermediate ranked results is adjusted based on the determined sellers' trust level values to form the final ranked results to be displayed for the user.

Figure 2:
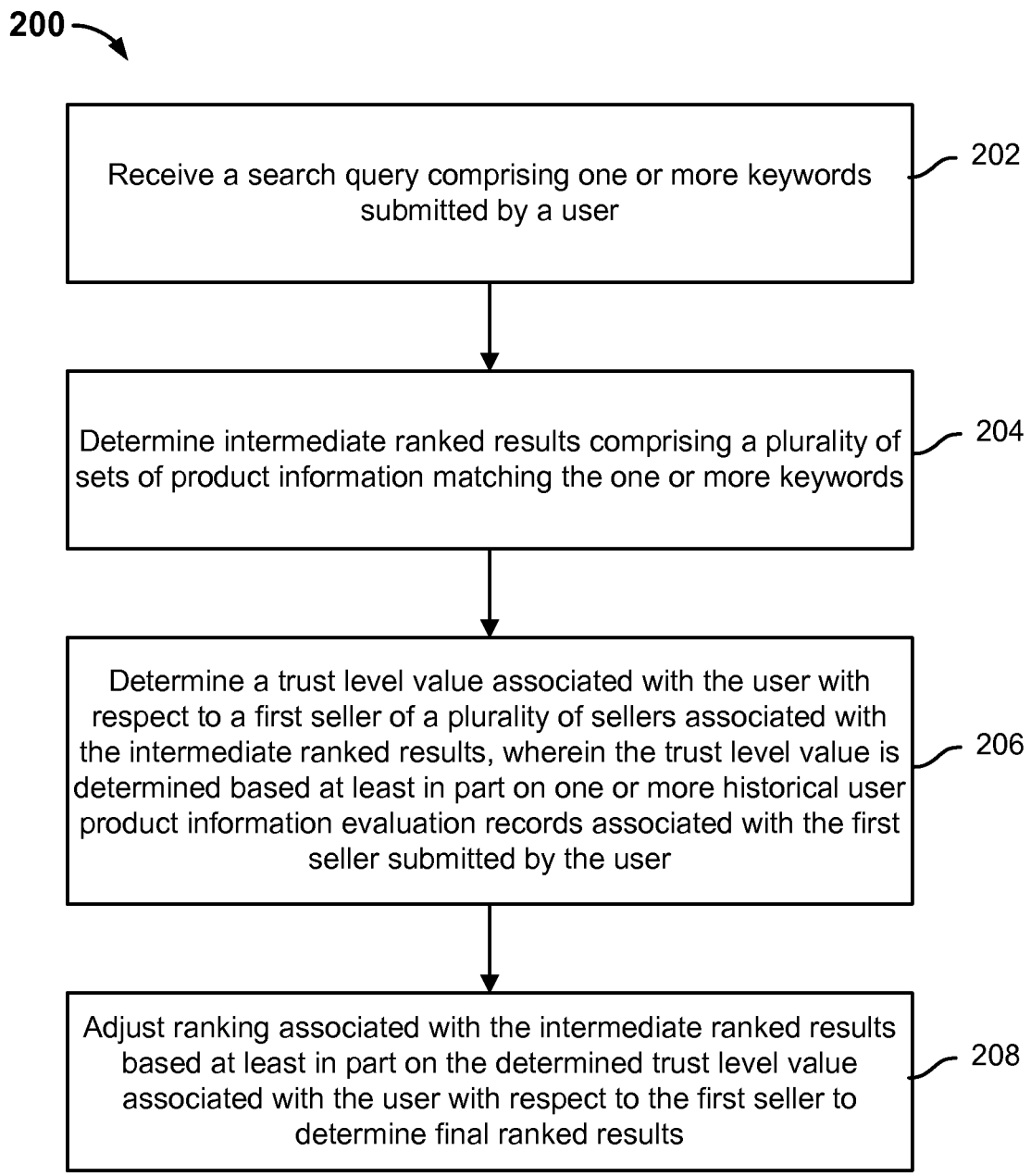
FIG. 2 is a flow diagram showing an embodiment of a process for adjusting search result rankings based on user trust level values with sellers.

FIG. 2 is a flow diagram showing an embodiment of a process for adjusting search result rankings based on user trust level values with sellers. In some embodiments, process 200 is implemented at system 100.

At 202, a search query comprising one or more keywords submitted by a user is received. In various embodiments, the search query is received at a search engine of an e-commerce website. For example, a user who is interested in buying a product at the e-commerce website may submit one or more keywords associated with the desired products.

At 204, intermediate ranked results comprising a plurality of sets of product information matching the one or more keywords are determined. In some embodiments, sets of product information that match the one or more keywords of the search query are determined. For example, a set of product information that includes a keyword that matches one or more keywords of the search query may be considered a matching set of product information. In some embodiments, the sets of matching product information are preliminarily ranked using a ranking technique. In some embodiments, the ranking of the intermediate ranked results is sometimes referred to as a first ranking.

A first example of a preliminary ranking technique is based on index weight terms and combined product information and seller scores for the matching sets of product information. This technique entails determining a composite score for each set of product information based on one or more of the following: title keywords, price, transaction volume, seller scores, and other characteristics. The following is an example of determining index weight terms and composite scores: Assume that the keywords input by the user in this example are "Clover classic sneakers." Assume that the search engine finds three index terms corresponding to these keywords: "Clover," "classic," and "sneakers." For example, an index term comprises a predetermined term that has been indexed by the search engine. Generally, each index term receives the same weight, but they can also be set at different weights. For example, a brand term ("Clover") weight can be set as 0.2; a noun term ("sneakers") weight can be set as 0.1; and an adjective ("classic") weight can be set as 0.05.

The intermediate ranked results include two sets of product information, Product Information Set A and Product Information Set B, that match the keywords of the search query. The title of Product Information Set A is "Adidas Clover unisex sneakers." Product Information Set A itself is associated with a quality score of 0.8 and the seller that is associated with Product Information Set A is associated with a quality score of 0.6. The title of Product Information Set B is "top A-Di-Da-Si ADIDAS 2011 new-style Clover classic style." Product Information Set B itself is associated with a quality score of 0.9 and the seller that is associated with Product Information Set B is associated with a quality score of 0.5.

The title of Product Information Set A includes two index terms associated with the search query: "Clover" and "sneakers." Thus, Product Information Set A's product information quality score is the sum of the included index terms' respective weights: 0.2+0.1=0.3. Product Information Set B includes two index terms associated with the search query: "Clover" and "classic." Thus, Product Information Set B's product information quality score is the sum of the included index terms' respective weights: 0.2+0.05=0.25.

Lastly, the product information quality score with the seller quality score are combined to determine the composite score for each set of product information. So, the composite score for Product Information Set A becomes 0.3+0.8+0.6=1.7 points and the composite score for Product Information Set B becomes 0.25+0.9+0.5=1.65 points. The composite score is then used to perform the preliminary ranking of the sets of matching product information to be included in the intermediate ranked results. Based on their respective composite scores, Product Information Set A would be ranked ahead of Product Information Set B among the intermediate ranked results.

While the above example determined a composite score for each search result (i.e., set of matching product information) based on index term weights and a seller score, the composite score may also be determined based on one or more other characteristics associated with each search result.

In some embodiments, if the intermediate ranked results include more than a predetermined number of sets of matching product information, then the first predetermined number of highest ranked sets of matching product information is retained for further processing and the other sets of matching product information are discarded. For example, the predetermined number of sets of matching product information may be 4,000.

At 206, a trust level value associated with the user with respect to a first seller of a plurality of sellers associated with the intermediate ranked results is determined, wherein the trust level value is determined based on one or more historical user product information evaluation records associated with the first seller submitted by the user. A trust level value associated with the user with respect to each seller associated with at least one intermediate ranked result is determined based on the user's historical product information evaluations submitted for one or more sets of product information associated with the seller. For example, if a set of product information for the product of a box of tennis balls sold by the seller SportsKing were included in the intermediate ranked results, then a trust level value is to be determined between the searching user, User A, and the seller, SportsKing. Assume that User A previously submitted product information evaluations for a Princeton brand tennis racquet and for a Princeton brand racquet bag sold by the seller SportsKing. The trust level value between User A and the seller SportsKing will be determined based on the historical product information evaluation records submitted by User A for the Princeton brand tennis racquet and for the Princeton brand racquet bag.

In some embodiments, the trust level value associated with the user with respect to a seller is determined by performing an averaging function with respect to values corresponding to historical product information evaluation records submitted by the user for products sold by that seller (e.g., sets of product information associated with the seller). Examples of the averaging function include arithmetic averages, weighted averages, or weighted moving averages. Returning to the previous example, assume that User A rated each of the Princeton brand tennis racquet and the Princeton brand racquet bag based on a scale of 1 to 5 stars, 5 stars being the highest and most favorable rating. User A gave the Princeton brand racquet 4 stars and the Princeton brand racquet bag 3 stars. Then the trust level value between User A and the seller SportsKing is then determined based on applying a selected averaging function (e.g., an arithmetic or a weighted averaging function) to the 4 stars and 3 stars evaluations submitted for the seller SportsKing.

The following is an example technique by which to determine the user's historical product information evaluation records:

The user is first identified by looking up an identifier associated with the user in a user evaluation records database. The user evaluation records database stores for each user identifier: user information (e.g., name, birthdate), sets of product information for which the user has previously submitted product information evaluations, identities of sellers associated with the sets of product information for which the user has previously submitted product information evaluations, and the corresponding evaluation records for the sets of product information for which the user has previously submitted product information evaluations.

In some embodiments, user identification information of the user (who submitted the search query) may be determined based on the following examples:

If the user is a registered user with the e-commerce website and has logged on (e.g., signed in) to the website prior to submitting the search query, the user identification information associated with the currently logged on user serves as the identity of the user.

However, if the user has not logged on to the e-commerce website prior to submitting the search query, then the user identifier of the user may be identified using a cookie. A cookie may comprise a small amount of data stored at the user's client device for tracking a user's information. Stored information may include a user's browsing history and/or a user's login information.

Cookie-based user identification is a common technique of user identification. For example, when a cookie is obtained through a self-defined Apache™ log format or a JavaScript™, a highly effective means of use identification is obtained. Cookies (so long as they have not been deleted) can be considered as bound to a client's specific device. Typically, the accuracy of cookie-based user identification is relatively high. For example, when a user registers with a particular e-commerce website (e.g., the e-commerce website Taobao.com), cookie information is stored on the device the user used to access the website. So, the next time a user visits Taobao.com, Taobao.com will go to the designated path of the device to obtain the cookie information. If the cookie information can be obtained, then the user's login name (which was previously used and stored) can be obtained even if the user does not log on during this particular browsing session. If the user's information cannot be obtained from the cookie or if the cookie cannot be located on the client's device, then a new cookie will be stored at the client device. Therefore, stored cookies may be used to obtain user identification information for users who have not logged onto the e-commerce website prior to submitting the search query.

Examples of product information evaluations may comprise three approaches: a dynamic rating system, a multi-grade approach (e.g., good, average, poor), and a free-form review system. In various embodiments, any type of product information system may be used so long as the rating/grade included in the product information evaluation comprises a quantifiable value or can be mapped to a quantifiable value. Quantifying a rating/grade included in a product information evaluation record is useful because values corresponding to product information evaluation records may be used to compute trust level values associated with a user with respect to sellers. For example, if a product information evaluation is based on a numerical ratings scale, then the rating comprises a value that can be directly used for trust level value computations. Also for example, if a product information evaluation is based on text that can be mapped to values, then certain keywords (e.g., tone-indicating keywords such as "excellent," "good," "unsatisfactory") can be mapped to values, which may then be used for trust level value computations.

The following is an example of determining a trust level value between a user and a particular seller. Assume that User A has historically made 10 purchases associated with Seller X. User A has also submitted a product information evaluation (also sometimes referred to as an "evaluation record") for each of the 10 purchases associated with Seller X. User A has included in 6 of the 10 evaluation records a score of 5 (extremely satisfied), 2 of 10 evaluation records a score of 4 (fairly satisfied), and 2 of 10 evaluation records a score of 3 (satisfied).

If the arithmetic average were used to determine the trust level value associated with User A with respect to Seller X, then the trust level value would be determined as the sum of the respective scores of the 10 evaluation records divided by 10: $(6 \times 5 + 2 \times 4 + 2 \times 3)/10 = 4.4$.

If the weighted average were used to determine the trust level value associated with User A with respect to Seller X, an average can be taken after a weight is assigned to each evaluation record (e.g., based on any determined scheme). One example scheme of weight assignment to each evaluation record is the age associated with the evaluation record. The weight of each evaluation record could incrementally decrease (e.g., linearly or exponentially) over time. As a result, evaluation records that were generated more recently are weighted more while evaluation records that were generated longer ago are weighted less.

At 208, ranking associated with the intermediate ranked results is adjusted to determine final ranked results based at least in part on the determined trust level value associated with the user with respect to the first seller. In some embodiments, the ranking of the final search results is sometimes referred to as a second ranking. The first/preliminary ranking of the search results within the intermediate ranked results is then adjusted based on the determined trust level values between the user and various sellers associated with the intermediate ranked results. Put another way, the order/sequence of the search results included in the intermediate ranked results may be changed due to the determined trust level values associated with the sellers associated with the search results. In various embodiments, the second ranking is based on adjusting the first ranking of the search results in the intermediate ranked results on the basis of the trust level values between the user and sellers associated with the search results. In various embodiments, if the final ranked results include a first search result and a second search result and the second search result is associated with a seller that is associated with a higher trust level value with the user, then second ranking of the search results within the final ranked results will rank the second search result higher than the first search result. As described above, a trust level value associated with a user with respect to a seller will determine the placement of a search result associated with that seller within the ranking of the final ranked results, where a search result associated with a higher trust level value will appear earlier in the second ranking than another search result associated with a lower trust level value.

In some embodiments, at least some the final ranked results (i.e., adjusted intermediate ranked results) are displayed at a user interface for the user to browse. The final ranked results should place search results (sets of product information) associated with sellers more trusted by the user (i.e., sellers associated with higher trust level values) higher within the second ranking than search results (sets of product information) associated with sellers less trusted by the user (i.e., sellers associated with lower trust level values) so that the search results associated with more trusted sellers may be more conveniently seen by the user. Therefore, the final ranked results will be optimized so as to account for a user's varying trust level values of different sellers. For example, in the intermediate ranked results, assume that Product Information Set A is ranked ahead of Product Information Set B. However, the user previously complained about Seller X, which is associated with Product Information Set A, or the user previously gave Seller X, which is associated with Product Information Set A, a poor rating. As a result, the trust level value between the user and Seller X, who is associated with Product Information Set A, may be lower than the trust level value between the user and Seller Y, who is associated with Product Information Set B. Therefore, based on the respective trust level values, the second ranking will rank Product Information Set B ahead of Product Information Set A.

The following is an example of a first technique of using determined trust level values to determine the second ranking associated with the final ranked results:

The trust level values associated with the user with respect to various sellers are compared against a predetermined trust level threshold value. If a trust level value for a seller is greater than the predetermined trust level threshold value, then the seller is included in a white list. Otherwise, if a trust level value for a seller is equal to or less than the predetermined trust level threshold value, then the seller is included in a black list. The first ranking of the intermediate ranked results is then adjusted based on the white list and the black lists. For example, the sequence of the intermediate ranked results may be adjusted such that any search result associated with a seller on the white list appears ahead of any search result associated with a seller on the black list. Then among all search results associated with sellers on the white list, search results are ranked based on their respective sellers' trust level values (i.e., a search result associated with a seller associated with a higher trust level value will be ranked higher than another search result associated with a seller associated with a lower trust level value). Similarly, among all search results associated with sellers on the black list, search results are ranked based on their respective sellers' trust level values.

By comparing the trust level values between the user and sellers associated with the product information in the intermediate ranked results with a predetermined trust level threshold value, the threshold value may be used to draw a line between sellers that a user likely trusts and sellers that the user likely does not trust. If a seller is associated with a trust level value that is higher than the threshold value, then the user likely trusts this seller. However, if a seller is associated with a trust level value that is equal to or less than the threshold value, then the user likely does not trust this seller. As such, a white list is used to store trusted sellers, and a black list is used to store untrusted sellers.

In some embodiments, a trust level value can only be determined between a user and a particular seller that is actually associated with a product information evaluation previously submitted by the user. Put another way, a trust level value may not be able to be determined between a user and a seller who is not associated with any product information evaluations previously submitted by the user. In some embodiments, such a seller is not assigned a trust level value of any value. (But as will be described below with the second technique, in some other embodiments, a seller for which a trust level value cannot be determined is automatically assigned a certain trust level value). Therefore, in determining the second ranking, only the rankings of those search results included in the intermediate ranked results associated with a seller for which a trust level value has been computed can be adjusted. Because it is unlikely that trust level values have been determined for each seller associated with a search result within the intermediate ranked results, it is likely that not all of the search results' rankings within the first ranking needs to be adjusted based on trust level values, which will reduce the number of computations.

In some embodiments, the trust level threshold value can be set according to consumer consumption psychology or user-trust level value distributions. As for applications involving user-trust level value distributions, the predetermined trust level threshold value may be obtained by processing all Internet user evaluation records of sellers associated with product information. Assuming that an e-commerce website has 2 million sellers and 30 million users, such processing can obtain average evaluation grades from the 30 million users' evaluation records. Alternatively, the evaluation records of the 30 million users are ranked from low to high based on their evaluation grades, and the numerical value corresponding to the record at the 61.8% ranking is taken as the predetermined trust level threshold value. In some embodiments, the predetermined trust level threshold value may be a configurable value. The predetermined trust level threshold value may be determined based on other factors as well.

The following is an example of a second technique of using determined trust level values to determine the second ranking associated with the final ranked results:

If the trust level value between the user and a seller associated with intermediate ranked results cannot be determined, then the user is automatically assigned a trust level value that is the predetermined trust level threshold value. For example, a user for which a trust level value cannot be determined may be a user for which the user never submitted any product information evaluations. The second ranking of the final ranked results may be ranked based on the search results' respective seller's trust level values. Unlike the first technique, a white list and a black list are not used, but rather the search results of the intermediate ranked results are directly rearranged to be in a second ranking based on their respective associated trust level values.

Figure 3:
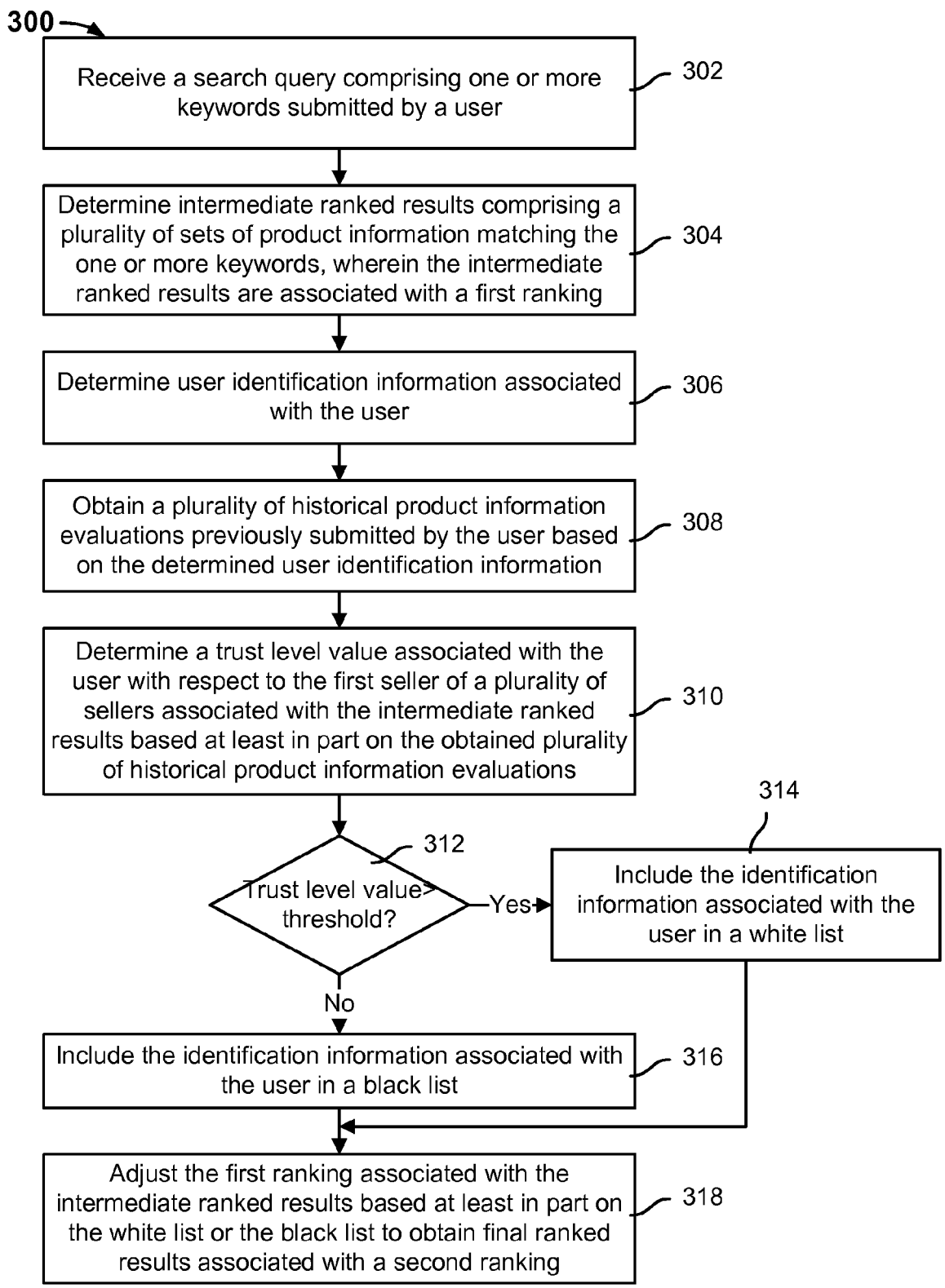
FIG. 3 is a flow diagram showing an example of a process for adjusting search result rankings based on user trust level values with sellers.

FIG. 3 is a flow diagram showing an example of a process for adjusting search result rankings based on user trust level values with sellers. In some embodiments, process 300 is implemented at system 100.

At 302, a search query comprising one or more keywords submitted by a user is received. For example, the search query may be received at a search engine associated with an e-commerce website.

At 304, intermediate ranked results comprising a plurality of sets of product information matching the one or more keywords are determined, wherein the intermediate ranked results are associated with a first ranking. In some embodiments, the intermediate ranked results are associated with a predetermined number of search results such that only the top predetermined number of search results of the first ranking is retained for further processing while the remaining search results are not retained for further processing.

At 306, user identification information associated with the user is determined. In some embodiments, user identification information is stored for each user who has performed registration at the e-commerce website. For example, user identification information (e.g., a user identifier) of the searching user may be determined from the currently logged on status of the searching user or if the user did not log on prior to performing the search, then cookie information stored at the client device used by the user may be obtained to determine the user's identification information.

At 308, a plurality of historical product information evaluations previously submitted by the user is obtained based on the determined user identification information. For example, each registered user's historical product information evaluation records among other historical information such as product purchase information, at the e-commerce website, are stored and those belonging to the user may be looked up based on the user's determined identification information.

At 310, based at least in part on the obtained plurality of historical product information evaluations previously submitted by the user, a trust level value associated with the user with respect to a first seller of a plurality of sellers associated with the intermediate ranked results is determined. As described above, a trust level value of a seller who is associated with at least one search result (set of product information that matched the search query) included in the intermediate ranked results is determined based on the user's historical evaluation records associated with that seller. A value (e.g., grade, rating) is determined from each evaluation record based on either a direct numerical grade/rating or based on mapping a text-based grade/keyword to a value. Then an averaging function (e.g., arithmetic average, weighted average, weighted moving average) is performed on the values corresponding to the evaluation records associated with the seller to determine the trust level value associated with the user with respect to that seller.

At 312, it is determined whether the trust level value associated with the user with respect to the first seller exceeds a predetermined trust level threshold value. In the event that the trust level value exceeds the predetermined trust level threshold value, control passes to 314, where identification information associated with the first seller is included into a white list. Otherwise, in the event that the trust level value is equal to or less than the predetermined trust level threshold value, control passes to 316, where identification information associated with the first seller is included into a black list.

At 318, the first ranking associated with the intermediate ranked results is adjusted based at least in part in on the white list or the black list to obtain final ranked results associated with a second ranking As described above, the sequence/order of the search results in the intermediate ranked results may be adjusted based on the white list and the black list. For example, in the second ranking of the final ranked results, search results associated with seller(s) from the white list are ordered/ranked ahead of search results associated with seller(s) from the black list. Then among search results associated with sellers on the white list, search results associated with sellers with higher trust level values are ordered/ranked ahead of search results associated with sellers with lower trust level values. Similarly, among search results associated with sellers on the black list, search results associated with sellers with higher trust level values are ordered/ranked ahead of search results associated with sellers with lower trust level values. In the final ranked results, search results associated with sellers with the highest trust level values should be ranked at the top of the list.

In some embodiments, at least a portion of the final ranked results is displayed for the user at a user interface so that the user may browse through the search results. The final ranked results should rank search results associated with sellers that the user trusts more (e.g., sellers with higher trust level values) higher than search results associated with sellers that the user trusts less (e.g., sellers with lower trust level values).

Figure 4:
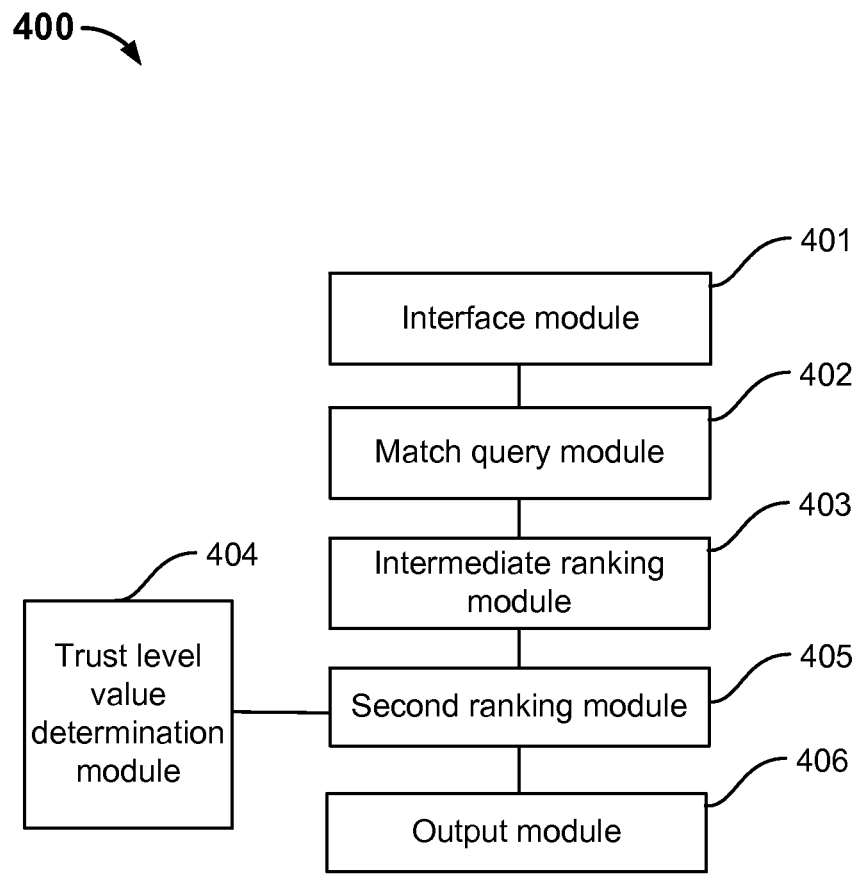
FIG. 4 is a diagram showing an embodiment of a system for adjusting search result rankings based on user trust level values with sellers.

FIG. 4 is a diagram showing an embodiment of a system for adjusting search result rankings based on user trust level values with sellers. In the example, system 400 includes interface module 401, match query module 402, intermediate ranking module 403, second ranking module 405, output module 406, and trust level value determination module 404.

The modules and submodules can be implemented as software components executing on one or more processors, as hardware such as programmable logic devices and/or Application Specific Integrated Circuits designed to perform certain functions, or a combination thereof. In some embodiments, the modules and submodules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules and submodules may be implemented on a single device or distributed across multiple devices.

Interface module 401 is configured to receive one or more keywords of a search query input by the user at an e-commerce website.

Match query module 402 is configured to perform a keyword match between the keywords of the search query and stored sets of product information.

Intermediate ranking module 403 is configured to perform a preliminary/first ranking of the determined sets of matching product information, which serve as the intermediate ranked results. In some embodiments, after performing the preliminary ranking of the intermediate ranked results, if there are more than a predetermined number of search results, only the first predetermined number of search results is retained for further processing.

Trust level value determination module 404 is configured to determine trust level values associated with the user with respect to different sellers associated with the search results of the intermediate ranked results.

Second ranking module 405 is configured to perform a second ranking of the search results in the intermediate ranked results to obtain corresponding final ranked results based on the determined trust level values. The search results of the final ranked results are ordered in a second ranking, where search results associated with sellers with higher trust level values are ranked higher and search results associated with sellers with lower trust level values are ranked lower.

Output module 406 is configured to display at least search results (sets of product information) to the user starting with those near or at the top of the final ranked results.

In some embodiments, second ranking module 405 may further comprise:

A comparison submodule that is configured to compare trust level values of sellers associated with product information in the intermediate ranked results against a predetermined trust level threshold value. If a trust level value associated with a particular seller is greater than the trust level threshold value, then the user identification information of the corresponding seller is stored on a white list. Or if the trust level value associated with the particular seller is equal to or less than the trust level value threshold value, then the user identification information of the corresponding seller is stored on a black list.

A first ranking submodule is configured to place search results associated with sellers on the white list at higher rankings than search results associated with sellers on the black list. The first ranking submodule is also configured to rank each search result associated with sellers on the white list based on the trust level value of the seller associated with the search result. Furthermore, the first ranking submodule is also configured to rank each search result associated with sellers on the white list based on the trust level value of the seller associated with the search result.

In some embodiments, second ranking module 405 may further comprise:

Trust level value assigning submodule configured to assign a trust level value associated with the user with respect to a particular seller who is not associated with any historical product information evaluations that was previously submitted by the user. In some embodiments, the trust level value assigning submodule is configured to assign such a seller the predetermined trust level threshold value as the seller's trust level value.

A second ranking submodule that is configured to rank search results in the final ranked results in high-to-low order based on the trust level values associated with the search results.

In some embodiments, trust level value determination module 404 is configured to perform an averaging function on the one or more of the user's historical product information evaluations associated with a seller to determine the trust level value associated with the user with respect to that seller.

In some embodiments, system 400 may further include:

An evaluation record acquiring module that is configured to obtain evaluation records previously submitted by the user associated with sellers associated with the search results included in the intermediate ranked results. In some embodiments, the evaluation record acquiring module may further comprise:

An identification submodule that is configured to identify the user.

A record searching submodule that is configured to look up evaluation records associated with the user in a database associated with the user based on the user's determined identification information.

In some embodiments, the identification submodule may further comprise:

A first identification unit configured to recognize the user's identification information as the identity of the user when the user logs on to the e-commerce website.

A second identification unit is configured to obtain a cookie associated with the user to identify the user when the user browses the e-commerce website without logging on.

Each of the embodiments contained in this specification is described in a progressive manner, the explanation of each embodiment focuses on areas of difference from the other embodiments, and the descriptions thereof may be mutually referred to for portions of each embodiment that are identical or similar.

A person skilled in the art should understand that the embodiments of the present application can be provided as methods, systems, or computer software products. Therefore, the present application can take the form of embodiments consisting entirely of hardware, embodiments consisting entirely of software, or embodiments which combine software and hardware. In addition, the present application can take the form of computer program products implemented on one or more computer-operable storage media (including but not limited to magnetic disk storage devices, CD-ROMs, and optical storage devices) containing computer operable program codes.

The present application is described with reference to flow charts and/or block diagrams based on methods, equipment (systems) and computer program products. It should be understood that each process and/or block in the flow charts and/or block diagrams, and combinations of processes and/or blocks in the flow charts and/or block diagrams, can be achieved through computer program commands. One can provide these computer commands to a general-purpose computer, a specialized computer, an embedded processor or the processor of other programmable data equipment so as to give rise to a machine, with the result that the commands executed through the computer or processor of other programmable data equipment give rise to a device that is used to realize the functions designated by one or more processes in a flow chart and/or one or more blocks in a block diagram.

These computer program commands can also be stored on computer-readable storage devices that can guide computers or other programmable data equipment to operate in a particular way, with the result that the commands stored on these computer-readable storage devices give rise to products that include command devices. These command devices realize the functions designated in one or more processes in a flow chart and/or one or more blocks in a block diagram.

These computer program commands can also be loaded onto a computer or other programmable data equipment, with the result that a series of operating steps are executed on a computer or other programmable equipment so as to give rise to computer processing. In this way, the commands executed on a computer or other programmable equipment provide steps for realizing the functions designated by one or more processes in a flow chart and/or one or more blocks in a block diagram.

The above embodiment explanations are only meant to aid in comprehension of the methods of the present application and of its core concepts. Moreover, a person with ordinary skill in the art would, on the basis of the concepts of the present application, be able to make modifications to specific applications and to the scope of applications. To summarize the above, the contents of this description should not be understood as limiting the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system to adjust search results ranking, comprising:
one or more hardware processors configured to:
  receive a search query comprising one or more keywords submitted to an e-commerce website by a user;
  determine intermediate ranked results comprising a plurality of sets of product information matching the one or more keywords;
  in response to the intermediate ranked results being determined, determine a trust level value associated with the user with respect to a first seller of a plurality of sellers associated with the intermediate ranked results, wherein the trust level value is, determined based at least in part on one or more historical user product information evaluation records associated with the first seller submitted by the user, wherein the one or more historical user product information evaluation records are stored in database that is associated with the e-commerce website and that stores a mapping of user product information evaluations to seller identifiers; and
  adjust the ranking associated with, the intermediate ranked results based at least in part on the determined trust level value associated with, the user with respect to the first seller to determine final ranked results, wherein to adjust the ranking associated with the intermediate ranked results comprises to:
    determine whether the trust level value exceeds a predetermined trust level threshold value;
    in the event that the trust level value exceeds the predetermined trust level threshold value, add identification information associated with the first seller onto white list; and
    in the event that the trust level value does not exceed the predetermined trust level threshold value, add identification information associated with the first seller onto a black list; and
  wherein the ranking associated with the intermediate ranked results is adjusted based on the white list and the black list such that a first search result of the intermediate ranked results associated with a seller on the white list is determined to be ranked higher than a second search result of the intermediate ranked results associated with a seller on the black list; and
one or more memories coupled to the one or more hardware processors and configured to provide the one or more hardware processors with instructions that are to be executed by the one or more hardware processors.

2. The system of claim 1, wherein the intermediate ranked results are associated with a first ranking, wherein the first ranking is determined based at least in part on index term weights associated with search results included in the intermediate ranked results.

3. The system of claim 1, wherein the intermediate ranked results are associated with a first ranking, wherein the first ranking is determined based at least in part on composite scores associated with search results included in the intermediate ranked results.

4. The system of claim 1, wherein a first portion of the intermediate ranked results associated with a predetermined number of search results is retained and a second portion of the intermediate ranked results beyond the predetermined number of search results is discarded to determine the final ranked results.

5. The system of claim 1, wherein identification information of the user is determined based at least on one or more of the following: a logged on status associated with the user and data associated with a cookie stored at a device associated with the user.

6. The system of claim 5, wherein the one or more historical user product information evaluation records associated with the first seller is determined based at least in part on the identification information of the user.

7. The system of claim 1, wherein the trust level value is determined based at least in part on performing an averaging function with respect to values corresponding to the one or more historical user product information evaluation records.

8. The system of claim 1, wherein the trust level is determined based at least in part on a weighted average of one or more historical user product information evaluation records associated with the first seller submitted by the user.

9. The system of claim 8, wherein weights are determined for the corresponding one or more historical user product information evaluation records, the weights being determined according to a time at which the corresponding one or more histon'cal user product information evaluation records were submitted.

10. The system of claim 9, wherein evaluation records that were generated more recently are weighted more and evaluation records that were generated longer ago are weighted less.

11. The system of claim 1, wherein the seller identifier is registered with a server associated with the e-commerce website and cannot be changed.

12. The system of claim 1, wherein the determining of the trust level value associated with the user with respect to a first seller of a plurality of sellers associated with the intermediate ranked results comprises:
   retrieving, using corresponding seller identifiers associated with the plurality of sets of product information comprised in the intermediate ranked result, a plurality of historical use products information evaluation records respectively corresponding to the plurality of sets of product information comprised in the intermediate ranked results.

13. The system of claim 1, wherein the determining of the intermediate ranked results comprises computing composite scores for the plurality of sets of product information, the composite scores being based on a plurality of product characteristics.

14. The system of claim 13, wherein the adjusting of the ranking associated with the intermediate ranked results comprises:
   computing adjusted composite scores for the plurality of sets of product information based at least in part on the computed composite scores and a plurality of historical use products information evaluation records respectively corresponding to the plurality of sets of product information; and
   adjusting the ranking associated with the intermediate ranked results based at least in part on the adjusted composite scores.

15. A method to adjust search results ranking, comprising:
   receiving a search query comprising one or more keywords submitted to an e-commerce website by a user;
   determining intermediate ranked results comprising a plurality of sets of product information matching the one or more keywords;
   in response to the intermediate ranked results being determined, determining a trust level value associated with the user with respect to a first seller of a plurality of sellers associated with the intermediate ranked results, wherein the trust level value is determined based at least in part on one or more historical user product information evaluation records associated with the first seller submitted by the user, wherein the one or more historical user product information evaluation records are stored in database that is associated with the e-commerce website and that stores a mapping of user product information evaluations to seller identifiers; and
   adjusting ranking associated with the intermediate ranked results based at least in part on the determined trust level value associated with the user with respect to the first seller to determine final ranked results, wherein adjusting the ranking associated with the intermediate ranked results comprises:
      determining whether the trust level value exceeds a predetermined trust level threshold value,
      in the event that the trust level value exceeds the predetermined trust level threshold value, adding identification information associated with the first seller onto a white list; and
      in the event, that the trust level value does not exceed the predetermined trust level threshold value, adding identification information associated with the first seller onto a black list; and
      wherein the ranking associated with the intermediate ranked results is adjusted based on the white list and the black list such that a first search result of the intermediate ranked results associated with a seller on the white list is determined to be ranked higher than a second search result of the intermediate ranked results associated with a seller on the black list.

16. The method of claim 15, wherein the intermediate ranked results are associated with a first ranking, wherein the first ranking is determined based at least in part on index term weights associated with search results included in the intermediate ranked results.

17. The method of claim 15, wherein the intermediate ranked results are associated with a first ranking, wherein the first ranking is determined based at least in part on composite scores associated with search results included in the intermediate ranked results.

18. The method of claim 15, wherein a first portion of the intermediate ranked results associated with a predetermined number of search results is retained and a second portion of the intermediate ranked results beyond the predetermined number of search results is discarded to determine the final ranked results.

19. The method of claim 15, wherein identification information of the user is determined based at least on one or more of!the following: a logged on status associated with the user and data associated with a cookie stored at a device associated with the user.

20. The method of claim 19, wherein the one or more historical user product information evaluation records associated with the first seller is determined based at least in part on the identification information of the user.

21. The method of claim 15, wherein the trust level value is determined based at least in part on performing an averaging function with respect to values corresponding to the one or more historical user product information evaluation records.

22. The method of claim 15, wherein the determining of the trust level value associated with the user with respect to a first seller of a plurality of sellers associated with the intermediate ranked results comprises:
   retrieving, using corresponding seller identifiers associated with the plurality of sets of product information comprised in the intermediate ranked result, a plurality of historical use products information evaluation records respectively corresponding to the plurality of sets of product information comprised in the intermediate ranked results.

23. The method of claim 15, wherein the determining of the intermediate ranked results comprises computing composite scores for the plurality of sets of product information, the composite scores being based on a plurality of product characteristics.

24. The method of claim 23, wherein the adjusting of the ranking associated with the intermediate ranked results comprises:
   computing adjusted composite scores for the plurality of sets of product information based at least in part on the computed composite scores and a plurality of historical use products information evaluation records respectively corresponding to the plurality of sets of product information; and adjusting the ranking associated with the intermediate ranked results based at least in part on the adjusted composite scores.

25. A computer program product for adjusting search results ranking, the computer program product being embodied in a non-transitory computer readable storage medium and comprising computer instructions for:

receiving a search query comprising one or more keywords submitted to an e-commerce website by a user;

determining intermediate ranked results comprising a plurality of sets of product information matching the one or more keywords;

in response to the intermediate ranked results being determined, determining a trust level value associated with the user with respect to a first seller of a plurality of sellers associated with the intermediate ranked results, wherein the trust level value is determined based at least in part on one or more historical user product information evaluation records associated with the first seller submitted by the user, wherein the one or more historical user product information evaluation records are stored in database that is associated with the e-commerce website and that stores a mapping of user product information evaluations to seller identifiers; and adjusting ranking associated with the intermediate ranked results based at least in part on the determined trust level value associated with the user with respect to the first seller to determine final ranked results, wherein adjusting the ranking associated with the intermediate ranked results comprises:

determining whether the trust level value exceeds a predetermined trust level threshold value;

in the event that the'trust level value exceeds the predetermined trust level threshold value, adding identification information associated with the first seller onto a white list and in the event that the trust level value does not exceed the predetermined trust level threshold value, add identification information associated with the, first seller onto a black list; and wherein the ranking associated with the intermediate ranked results is adjusted based on the white list and the black list such that a first search result of the intermediate ranked results associated with a seller on the white list is determined to be ranked higher than a second search result of the intermediate ranked results associated with a seller on the black list.

26. The method of claim 1, wherein the trust level value associated with respect to a first seller is determined based on one or more historical user product information evaluation records associated with the first seller submitted by not all users that have submitted a historical user product information evaluation record.

\* \* \* \* \*